US011330544B2

(12) United States Patent
Shang et al.

(10) Patent No.: US 11,330,544 B2
(45) Date of Patent: May 10, 2022

(54) METHOD AND DEVICE FOR AUTOMATICALLY CALIBRATING WIRELESS FREQUENCY OFFSETS (71) Applicant: ESPRESSIF SYSTEMS (SHANGHAI) CO., LTD., Shanghai (CN)

(72) Inventors: Ke Shang, Shanghai (CN); Zhifu Liu, Shanghai (CN); Ping Huang, Shanghai (CN)

(73) Assignee: ESPRESSIF SYSTEMS (SHANGHAI) CO., LTD., Shanghai (CN)

( * ) Notice: Subject to any disclaimer, the term of this patent is extended or adjusted under 35 U.S.C. 154(b) by 69 days.

(21) Appl. No.: 16/635,880

(22) PCT Filed: Sep. 30, 2018

(86) PCT No.: PCT/CN2018/109001
§ 371 (c)(1),
(2) Date: Jan. 31, 2020

(87) PCT Pub. No.: WO2019/024946
PCT Pub. Date: Feb. 7, 2019

(65) Prior Publication Data
US 2021/0136708 A1 May 6, 2021

(30) Foreign Application Priority Data

Aug. 2, 2017 (CN) .......................... 201710652881.9

(51) Int. Cl.
*H04W 56/00* (2009.01)
*H04W 48/16* (2009.01)
(Continued)

(52) U.S. Cl.
CPC ......... *H04W 56/002* (2013.01); *H04W 48/16* (2013.01); *H04W 56/0035* (2013.01)

(58) Field of Classification Search
None
See application file for complete search history.

(56) References Cited

U.S. PATENT DOCUMENTS 5,652,574 A * 7/1997 Wachob .............. H04W 88/187
340/7.45
2004/0152434 A1 8/2004 Peterson, III
(Continued)

FOREIGN PATENT DOCUMENTS

CN 1819447 A 8/2006
CN 104683044 A 6/2015
(Continued)

OTHER PUBLICATIONS

PCT/CN2018/109001, International Search Report dated Dec. 28, 2018.
(Continued)

*Primary Examiner* — Jay L Vogel
(74) *Attorney, Agent, or Firm* — Meunier Carlin & Curfman LLC (57) ABSTRACT Provided is a method for automatically calibrating wireless frequency offsets. The method includes following steps: a wireless fidelity (Wi-Fi) wireless transmission module monitors or scans a specific data packet of an access point (AP); the Wi-Fi wireless transmission module acquires a frequency offset between a central frequency of the Wi-Fi wireless transmission module and a central frequency of the AP according to the specific data packet; the Wi-Fi wireless transmission module executes frequency offset tracking according to the frequency offset to control the Wi-Fi wireless transmission module to calculate a central frequency according to a frequency offset acquired for a surrounding AP of the Wi-Fi wireless transmission module in such a way that each of the calculated central frequency and the frequency offset for the surrounding AP is in a preset standard, and adjusts the central frequency of the Wi-Fi wireless transmission module according to the calculated
(Continued)

central frequency. Provided is also a device for automatically calibrating wireless frequency offsets.

11 Claims, 1 Drawing Sheet

(51) Int. Cl.
*H04W 84/12* (2009.01)
*H04W 24/08* (2009.01)

(56) References Cited

U.S. PATENT DOCUMENTS

| | | | |
|---|---|---|---|
| 2006/0145775 A1 | 7/2006 | Zhang et al. | |
| 2013/0155931 A1* | 6/2013 | Prajapati | H04W 74/04 |
| | | | 370/336 |
| 2015/0003434 A1* | 1/2015 | Shi | H04W 24/08 |
| | | | 370/338 |
| 2016/0212719 A1* | 7/2016 | Chakraborty | H04W 56/0005 |
| 2017/0181097 A1* | 6/2017 | Ganesan | H04L 5/0007 |
| 2017/0311205 A1* | 10/2017 | Gerdes | H04W 28/10 |
| 2018/0324048 A1* | 11/2018 | Lee | H04W 48/16 |

FOREIGN PATENT DOCUMENTS

| | | |
|---|---|---|
| CN | 104883231 A | 9/2015 |
| CN | 106789792 A | 5/2017 |
| CN | 107295628 A | 10/2017 |

OTHER PUBLICATIONS

Office Action relating to Chinese Application No. 201710652881.9, dated Dec. 22, 2021.

\* cited by examiner

FIG. 1

FIG. 2

METHOD AND DEVICE FOR AUTOMATICALLY CALIBRATING WIRELESS FREQUENCY OFFSETS

CROSS-REFERENCE TO RELATED APPLICATIONS

This application is a US national phase application of international patent application No. PCT/CN2018/109001 filed on Sep. 30, 2018, which claims priority to Chinese patent application No. 201710652881.9 filed with the Chinese Patent Office on Aug. 2, 2017, the disclosures of each of which are fully incorporated herein by reference in their entireties.

TECHNICAL FIELD

The present disclosure relates to the field of communications technologies and, in particular, to a method and device for automatically calibrating wireless frequency offsets.

BACKGROUND

Wireless fidelity (Wi-Fi) may operate in 2.4 GHz or 5.8 GHz band. Each channel usually occupies a bandwidth of 20 MHz, or may use a bandwidth defined by a protocol, such as 5 MHz, 10 MHz, 40 MHz, 80 MHz or 160 MHz. A central point of frequency of the each channel is a channel central frequency. When a Wi-Fi chip monitors or transmits data in a channel, there is a frequency offset between central frequency of two communication parties, and a protocol defined frequency offset (frequency offset) is less than 20 parts per million (ppm).

An error for locating a central frequency by the Wi-Fi chip is usually related to the used crystal oscillator, and a frequency offset of the crystal oscillator is related to an environment temperature. The frequency offset of the crystal oscillator is usually within a range of 60 to 120 ppm at 120° C.; besides there are differences between crystal oscillators produced by different manufacturers.

When a Wi-Fi chip receives or transmits data, the data may be normally transmitted or received in a case of the frequency offset within a range of 60 ppm to −60 ppm, a decoding error may occur when the frequency offset is outside the above range.

Based on the above, if a Wi-Fi chip is used in a high-temperature environment, the frequency offset may achieve a range of 60 ppm to 120 ppm, abnormal communication between the Wi-Fi chip and other Wi-Fi chip will occur.

SUMMARY

The present disclosure provides a method and device for automatically calibrating wireless frequency offsets, through monitoring a specific data packet of a Wi-Fi device, a frequency offset between the Wi-Fi device and a designated communication device is acquired, so that self-regulation of the frequency of a Wi-Fi wireless transmission module can be realized, to enable a regulation result to be close to a theoretical central frequency of the designated communication device, thus the Wi-Fi wireless transmission module can be normally used at various temperatures to ensure a normal communication between the Wi-Fi wireless transmission module and the designated communication device.

In an embodiment, the present disclosure provides a method for automatically calibrating wireless frequency offsets. The method includes steps described below.

A Wi-Fi wireless transmission module monitors or scans a specific data packet of an access point (AP);

the Wi-Fi wireless transmission module acquires a frequency offset between a central frequency of the Wi-Fi wireless transmission module and a central frequency of the AP according to the specific data packet;

the Wi-Fi wireless transmission module executes frequency offset tracking according to the frequency offset to control the Wi-Fi wireless transmission module to calculate a central frequency according to a frequency offset acquired for a surrounding AP of the Wi-Fi wireless transmission module in such a way that each of the calculated central frequency and the frequency offset for the surrounding AP is in a preset standard, and adjusts the central frequency of the Wi-Fi wireless transmission module according to the calculated central frequency;

The step in which the specific data packet of the AP is monitored and scanned includes steps described below. A specific data packet of the surrounding AP of the Wi-Fi wireless transmission module is monitored, or a specific data packet of a designated communication AP is scanned.

In an embodiment, the step in which the Wi-Fi wireless transmission module monitors or scans the specific data packet of the AP includes a step described below.

The Wi-Fi wireless transmission module monitors or scans the specific data packet of the AP in a different manner according to an operation mode;

where, the operation mode includes a station (STA) mode, a soft AP (SoftAP) mode and a station and soft AP (STA&SoftAP) mode.

According to the above-mentioned method for automatically calibrating wireless frequency offsets, in an embodiment, the step in which the Wi-Fi wireless transmission module monitors or scans the specific data packet of the AP further includes steps described below.

In the STA mode or the STA&SoftAP mode, when an STA interface of the Wi-Fi wireless transmission module is unconnected to any AP or does not initiate a connection to any AP, the Wi-Fi wireless transmission module monitors the specific data packet of the surrounding AP;

in the STA mode or the STA&SoftAP mode, when the STA interface of the Wi-Fi wireless transmission module is connected to the designated communication AP or initiates a connection to the designated communication AP, the Wi-Fi wireless transmission module scans the specific data packet of the designated communication AP.

In an embodiment, when the Wi-Fi wireless transmission module operates in the STA mode, the above-mentioned method for automatically calibrating wireless frequency offsets includes steps described below.

When an STA interface of the Wi-Fi wireless transmission module is unconnected to any AP, if the STA interface is in an idle mode, the frequency offset is kept unchanged, and if the STA interface is not in the idle mode, a non-connection scan is executed; if the Wi-Fi wireless transmission module receives the specific data packet of the surrounding AP, the frequency offset is kept unchanged, and if the Wi-Fi wireless transmission module fails to receive the specific data packet of the surrounding AP, the frequency offset is modified and an enforced scan is initiated; if the specific data packet is received after the frequency offset is modified and the enforced scan is executed, the frequency offset tracking is executed, and if the specific data packet is not received after the frequency offset is modified and the enforced scan is executed, the frequency offset tracking is returned to an initial value;

when the STA interface attempts to get connected to the designated communication AP, a connection scan is executed; if the Wi-Fi wireless transmission module receives the specific data packet of the designated communication AP, the frequency offset is kept unchanged, and if the Wi-Fi wireless transmission module fails to receive the specific data packet of the designated communication AP, the frequency offset is modified and the enforced scan is initiated; if the specific data packet of the designated communication AP is received after the frequency offset is modified and the enforced scan is executed, the frequency offset tracking is executed, and if the specific data packet of the designated communication AP is not received after the frequency offset is modified and the enforced scan is executed, the frequency offset tracking is returned to the initial value;

when the STA interface is connected to the designated communication AP, the non-connection scan or the connection scan is executed, and the frequency offset tracking is executed following the connected designated communication AP.

In an embodiment, when the Wi-Fi wireless transmission module operates in the SoftAP mode, the above-mentioned method for automatically calibrating wireless frequency offsets includes steps described below.

The specific data packet of the surrounding AP is monitored at a first preset period; if there is failure in monitoring the specific data packet, no operation is executed, and if it successes in monitoring the specific data packet, the frequency offset tracking is executed.

In an embodiment, when the Wi-Fi wireless transmission module operates in the STA&SoftAP mode, the above-mentioned method for automatically calibrating wireless frequency offsets includes steps described below.

When an STA interface of the Wi-Fi wireless transmission module is connected to the designated communication AP, a non-connection scan or a connection scan is executed, and the frequency offset tracking is executed without following other APs expect the connected designated communication AP; when the STA interface is unconnected to any AP, a SoftAP interface of the Wi-Fi wireless transmission module is unconnected to any station, and the STA interface does not initiate a connection, the specific data packet of the surrounding AP is monitored at a second preset period; if the Wi-Fi wireless transmission module receives the specific data packet of the surrounding AP, the frequency offset is kept unchanged and the monitoring for a next period is continued, and if the Wi-Fi wireless transmission module fails to receive the specific data packet of the surrounding AP, the non-connection scan is executed; if the specific data packet of the surrounding AP is received during the non-connection scan, the frequency offset is kept unchanged, and if the specific data packet of the surrounding AP is not received, the frequency offset is modified and an enforced scan is initiated; if the specific data packet is received after the frequency offset is modified and the enforced scan is executed, the frequency offset tracking is executed, and if the specific data packet is not received after the frequency offset is modified and the enforced scan is executed, the frequency offset tracking is returned to an initial value;

when the STA interface is unconnected to any AP, the SoftAP interface is unconnected to any station, and the STA interface attempts to get connected to an AP, the connection scan is executed; if the Wi-Fi wireless transmission module receives the specific data packet of the designated communication AP, the frequency offset is kept unchanged, and if the Wi-Fi wireless transmission module fails to receive the specific data packet of the designated communication AP, the frequency offset is modified and the enforced scan is initiated; if the specific data packet of the designated communication AP is received after the frequency offset is modified and the enforced scan is executed, the frequency offset tracking is executed, and if the specific data packet of the designated communication AP is not received after the frequency offset is modified and the enforced scan is executed, the frequency offset tracking is returned to the initial value.

In an embodiment, when the Wi-Fi wireless transmission module operates in the STA&SoftAP mode, the method includes steps described below.

When the STA interface is unconnected to any AP, the SoftAP interface of the Wi-Fi wireless transmission module is connected to a station, and the STA interface does not initiate a connection, no operation is executed to ensure that a device mounted under the SoftAP interface is not dropped off;

when the STA interface is unconnected to any AP, the SoftAP interface is connected to a station, and the STA interface attempts to get connected to an AP, the connection scan is executed; if the Wi-Fi wireless transmission module receives the specific data packet of the designated communication AP, the frequency offset is kept unchanged, and if the Wi-Fi wireless transmission module fails to receive the specific data packet of the designated communication AP, the frequency offset is modified and the enforced scan is initiated; if the specific data packet of the designated communication AP is received after the frequency offset is modified and the enforced scan is executed, the frequency offset tracking is executed, and if the specific data packet is not received after the frequency offset is modified and the enforced scan is executed, the frequency offset tracking is returned to the initial value.

According to the above-mentioned method for automatically calibrating wireless frequency offsets, in an embodiment, the step in which when the STA interface is unconnected to any AP, the SoftAP interface of the Wi-Fi wireless transmission module is unconnected to any station, and the STA interface does not initiate the connection, the specific data packet of the surrounding AP is monitored at the second preset period, and if the Wi-Fi wireless transmission module fails to receive the specific data packet of the surrounding AP, the non-connection scan is executed includes a step described below. A manual non-connection scan operation actively initiated by a user is received.

According to the above-mentioned method for automatically calibrating wireless frequency offsets, in an embodiment, the step in which when the STA interface is unconnected to any AP, the SoftAP interface of the Wi-Fi wireless transmission module is connected to the station, and the STA interface does not initiate the connection, no operation is executed to ensure that the device mounted under the SoftAP interface is not dropped off includes a step described below.

When a user actively initiates a manual non-connection scan operation, no operation is executed to ensure that the device mounted under the SoftAP interface is not dropped off.

In an embodiment, the specific data packet includes a beacon or a probe response frame.

In an embodiment, the present disclosure further provides a device for automatically calibrating wireless frequency offsets. The device is applied to a Wi-Fi wireless transmission module and includes a monitoring control circuit, an automatic calibrator, and a frequency control circuit.

The monitoring control circuit is configured to monitor or scan a specific data packet of an AP;

the automatic calibrator is configured to acquire a frequency offset between a central frequency of the Wi-Fi wireless transmission module and a central frequency of the AP, and calculate a central frequency to be tracked;

the frequency control circuit is configured to execute frequency offset tracking according to the frequency offset to control the Wi-Fi wireless transmission module to calculate a central frequency according to a frequency offset acquired for a surrounding AP of the Wi-Fi wireless transmission module in such a way that each of the calculated central frequency and the frequency offset for the surrounding AP is in a preset standard, and adjust the central frequency of the Wi-Fi wireless transmission module according to the calculated central frequency.

In an embodiment, the device for automatically calibrating wireless frequency offsets further includes an operation mode controller.

The operation mode controller configured to control an operation mode;

the monitoring control circuit is configured to monitor or scan the specific data packet of the AP in a different manner according to the operation mode;

where, the operation mode includes a station (STA) mode, a soft AP (SoftAP) mode, and a station and soft AP (STA&SoftAP) mode.

The present disclosure acquires a frequency offset of a designated communication device through monitoring a specific data packet of other Wi-Fi device, so that a self-regulation of the frequency of the Wi-Fi wireless transmission module is realized, so as to enable the central frequency of the Wi-Fi wireless transmission module is close to the theoretical central frequency of the designated communication device, the Wi-Fi wireless transmission module can be normally used at various temperatures to ensure the normal communication between the Wi-Fi wireless transmission module and the designated communication device.

DETAILED DESCRIPTION

The present disclosure is illustrated below in conjunction with and not limited by the accompanying drawings.

The method according to the present disclosure may be applied to some devices of Internet of things capable of withstanding high temperatures, such as a Wi-Fi wireless transmission module of an intelligent electric cooker (its operation temperature may reach more than 100° C.).

Figure 1:
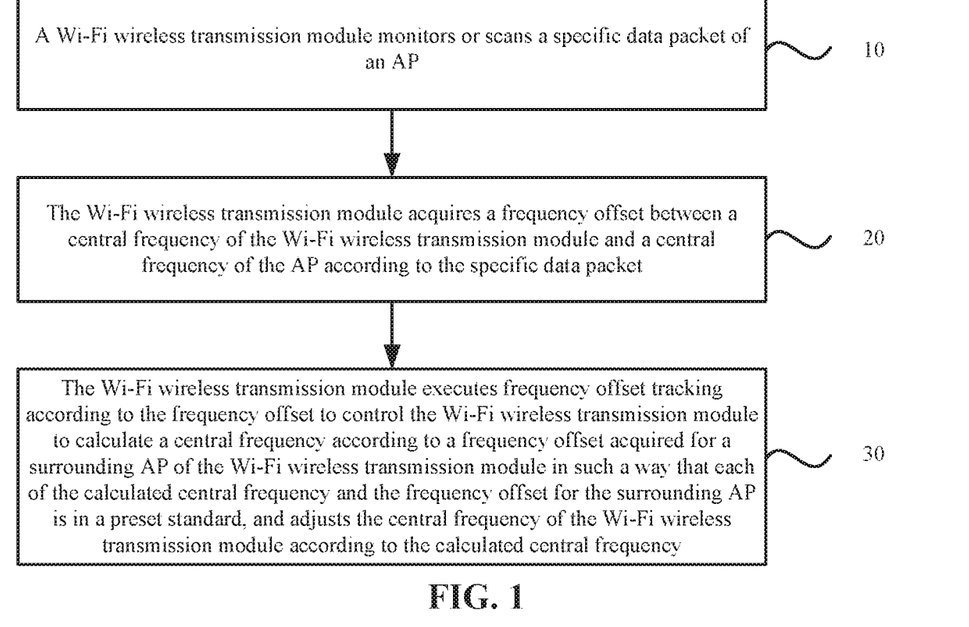
FIG. 1 is a flowchart of a method for automatically calibrating wireless frequency offsets according to the present disclosure.

As shown in FIG. 1, the present disclosure provides a method for automatically calibrating wireless frequency offsets. The method includes steps described below.

In step 10, a Wi-Fi wireless transmission module monitors or scans a specific data packet of an AP.

In step 20, the Wi-Fi wireless transmission module acquires a frequency offset between a central frequency of the Wi-Fi wireless transmission module and a central frequency of the AP according to the specific data packet.

In step 30, the Wi-Fi wireless transmission module executes frequency offset tracking according to the frequency offset to control the Wi-Fi wireless transmission module to calculate a central frequency according to a frequency offset acquired for a surrounding AP of the Wi-Fi wireless transmission module in such a way that each of the calculated central frequency and the frequency offset for the surrounding AP is in a preset standard, and adjusts the central frequency of the Wi-Fi wireless transmission module according to the calculated central frequency.

The step in which the specific data packet of the AP is monitored and scanned includes steps described below. A specific data packet of the surrounding AP of the Wi-Fi wireless transmission module is monitored, or a specific data packet of a designated communication AP is scanned.

In an embodiment, the central frequency is calculated according to the frequency offset information acquired for the surrounding AP of the Wi-Fi wireless transmission module, so that the calculated central frequency and the frequency offset for the surrounding AP are in the standard, then the central frequency of the Wi-Fi wireless transmission module is adjusted according to the calculated central frequency. The method provided by the present disclosure may be implemented by adding an automatic calibration logic in the Wi-Fi wireless transmission module, which may play a role in an operation at an abnormal temperature.

In an embodiment, the designated communication AP is also referred to as a designated AP. The designated AP refers to an AP that has established a connection or an AP that attempts to get connected.

In an embodiment, in an STA mode or an STA&SoftAP mode, when an STA interface of the Wi-Fi wireless transmission module is unconnected to any AP or does not initiate a connection to any AP, the Wi-Fi wireless transmission module monitors the specific data packet of other surrounding AP to acquire the frequency offset and executes the frequency offset tracking according to the frequency offset, so that the central frequency of the Wi-Fi wireless transmission module is kept in a reasonable communication range; when the STA interface of the Wi-Fi wireless transmission module is connected to the designated AP or is about to initiate a connection to the designated AP, the Wi-Fi wireless transmission module scans the specific data packet of the designated AP to acquire the frequency offset, and executes the frequency offset tracking according to the frequency offset, so that a normal communication with the designated AP is realized.

Embodiment One

An ESPWi-Fi chip as the Wi-Fi wireless transmission module is taken as an example to illustrate an implementation method for automatically calibrating wireless frequency offsets of the Wi-Fi wireless transmission module in different operation modes, the present disclosure is not limited to the ESPWi-Fi chip, the method provided by the present disclosure may be used to implement automatic calibration of wireless frequency offsets of any Wi-Fi chip which may determine the frequency offset of the received data packet. In the present embodiment, taken an ESP8266Wi-Fi chip as an example, through receiving a data packet of other Wi-Fi device to acquire a frequency offset value between this device and other Wi-Fi device, following different calibration solutions may be correspondingly executed for three different operation modes of an STA, a SoftAP, and an STA&SoftAP operated in a Wi-Fi wireless transmission module.

1. The Wi-Fi Wireless Transmission Module Operates in the STA Mode:

when an STA interface is unconnected to any AP, it is determined whether the STA interface is in an idle mode, if the STA interface is in the idle mode, the frequency offset does not change, and if the STA interface is not in the idle mode, a non-connection scan is executed; if the Wi-Fi wireless transmission module may receive a beacon or a probe response frame of other surrounding AP, the frequency offset does not change, and if the Wi-Fi wireless transmission module fails to receive the beacon or probe response of other surrounding AP, the frequency offset is modified and an enforced scan is initiated; if the beacon or probe response may be received after the frequency offset is modified and the enforced scan is executed, the frequency offset tracking is executed, and if the beacon or probe response may not be received after the frequency offset is modified and the enforced scan is executed, the frequency offset tracking is returned to an initial value.

When the STA interface attempts to get connected to the designated communication AP, a connection scan is executed; if the Wi-Fi wireless transmission module may receive a beacon or probe response of the designated AP, the frequency offset does not change, and if the Wi-Fi wireless transmission module fails to receive the beacon or probe response of the designated AP, the frequency offset is modified and the enforced scan is initiated; if the specific data packet of the designated AP may be received after the frequency offset is modified and the enforced scan is executed, the frequency offset tracking is executed, and if the beacon or probe response may not be received after the frequency offset is modified and the enforced scan is executed, the frequency offset tracking is returned to the initial value.

When the STA interface is connected to the designated AP, the non-connection scan or the connection scan is executed, the frequency does not follow any other AP to change, and the frequency offset tracking is performed only following the connected designated AP.

2. The Wi-Fi Wireless Transmission Module Operates in the SoftAP Mode:

a beacon or probe response of other surrounding AP is monitored at a first preset period, and if there is failure in monitoring a beacon or probe response, no operation is executed; and if the beacon or the probe response may be monitored, the frequency offset tracking is executed. In the present embodiment, the first preset period may be 6 seconds.

3. The Wi-Fi Wireless Transmission Module Operates in the STA&SoftAP Mode:

a connection status of the STA interface is determined, if the STA interface is connected to the designated AP, the non-connection scan or connection scan is executed, and the frequency offset tracking is performed following the connected designated AP; if the STA is unconnected to any AP, step 31 is executed;

In step 31, it is determined whether the SoftAP interface has an STA, if not, step 311 is executed; if so, step 312 is executed.

In step 311, when the STA interface does not initiate a connection, step 3111 is executed, when the STA attempts to get connected to an AP, step 3112 is executed.

In step 3111, the beacon or probe response of other surrounding AP is monitored at a second preset period; if the beacon or probe response of other surrounding AP may be received, the frequency offset does not change and the monitoring for a next period is continued, and if the beacon or probe response of other surrounding AP is not received, the non-connection scan is executed; if the beacon or probe response of other surrounding AP is received during the non-connection scan, the frequency offset does not change, and if the beacon or probe response of other surrounding AP is not received, the frequency offset is modified and the enforced scan is initiated; if the beacon or probe response is received after the frequency offset is modified and the enforced scan is executed, the frequency offset tracking is executed, and if the beacon or probe response is not received after the frequency offset is modified and the enforced scan is executed, the frequency offset tracking is returned to the initial value.

In step 3112, the connection scan is executed, if the beacon or probe response of the designated communication AP may be received, the frequency offset does not change, and if the beacon or probe response of the designated AP may not be received, the frequency offset is modified and the enforced scan is initiated; if the beacon or probe response of the designated AP may be received after the frequency offset is modified and the enforced scan is executed, the frequency offset tracking is executed, and if the beacon or probe response of the designated AP may not be received after the frequency offset is modified and the enforced scan is executed, the frequency offset tracking is returned to the initial value.

In step 312, when the STA interface does not initiates a connection, step 3121 is executed; when the STA interface attempts to get connected to an AP, step 3122 is executed.

In step 3121, no operation is executed to ensure that a device mounted under the SoftAP interface is not dropped off.

In step 3122, the connection scan is executed, if the beacon or probe response of the designated AP may be received, the frequency offset is unchanged; if the beacon or probe response of the designated AP is not received, the frequency offset is modified and the enforced scan is initiated; if the beacon or probe response of the designated AP may be received after the frequency offset is modified and the enforced scan is executed, the frequency offset tracking is executed; if the beacon or probe response may not be received after the frequency offset is modified and the enforced scan is executed, the frequency offset tracking is returned to the initial value. Under this condition, the STA interface may be preferentially ensured to get connected to an AP, a frequency offset range based on the delivered AP is within a reasonable range, and the Wi-Fi wireless transmission module itself may be adjusted to be within a theoretical frequency offset range following the AP at this time. In the above operations, the central frequency of the Wi-Fi wireless transmission module is modified, which may leads to a device mounted under the SoftAP interface to be dropped off, it may be considered that the STA device mounted under the interface is not in the theoretical frequency offset range at this time, and the device is adjusted following the frequency offset of the SoftAP interface.

In an embodiment, each of the step 3111 and step 3121 may further include a step described below. A manual non-connection scan operation actively initiated by a user is received.

In the step 3111, after the manual non-connection scan operation actively initiated and executed by a user is received, the step further includes steps described below.

The non-connection scan is executed, if the beacon or probe response of other surrounding AP may be received during the non-connection scan, the frequency offset does not change, and if the beacon or probe response of other surrounding AP fails to be received, the frequency offset is modified and the enforced scan is initiated; if the beacon or probe response may be received after the frequency offset is modified and the enforced scan is executed, the frequency offset tracking is executed; if the beacon or probe response may still fails to be received after the frequency offset is modified and the enforced scan is executed, the frequency offset tracking is returned to the initial value.

In the step 3121, when the user actively initiates execution of the manual non-connection scan operation, no operation is executed to ensure that a device mounted under the SoftAP interface is not dropped off. The reason for executing no operation is that since there is other STA device mounted under the SoftAP at this time, the frequency may not be adjusted at this time, because STA devices mounted under the interface may be dropped off (the STA interface and the SoftAP interface of a same chip use one radio frequency module).

According to the present disclosure, in the STA mode and STA&SoftAP mode, as mentioned in the step 3112 the process of "if the beacon or probe response of other surrounding AP may not be received, the frequency offset is modified and the enforced scan is initiated, if the beacon or probe response may be received after the frequency offset is modified and the enforced scan is executed, the frequency offset tracking is executed, if the beacon or probe response of other surrounding AP may not be received after the frequency offset is modified and the enforced scan is executed, the frequency offset tracking is returned to the initial value" may be "if no beacon or probe response of other surrounding AP is received, the frequency offset is enforced to be 0 ppm, a first enforced scan is initiated, it is determined whether the beacon or probe response of other surrounding AP is received, if the beacon or probe response of other surrounding AP is received, the frequency offset tracking is executed, if no beacon or probe response of other surrounding AP is received, the frequency offset is enforced to be −200 ppm, a second enforced scan is initiated, it is determined whether the beacon or probe response of other surrounding AP is received, and if the beacon or probe response of other surrounding AP is received, the frequency offset tracking is executed, and if the beacon or probe response of other surrounding AP is not received, the frequency offset tracking is returned to the initial value".

In the present embodiment, in the STA&SoftAP mode, as mentioned in the step 3112 and step 3122, the process of "if the beacon or probe response of the designated AP may not be received, the frequency offset is modified and the enforced scan is initiated, if the beacon or probe response of the designated AP may be received after the frequency offset is modified and the enforced scan is executed, the frequency offset tracking is executed, if the beacon or probe response of the designated AP may not be received after the frequency offset is modified and the enforced scan is executed, the frequency offset tracking is returned to the initial value" may be "if the beacon or probe response of the designated AP fails to be received, the frequency offset is enforced to be 0 ppm, a first enforced scan is initiated, it is determined whether the beacon or probe response of the designated AP is received, if the beacon or probe response of the designated AP is received, the frequency offset tracking is executed, if the beacon or probe response of the designated AP is not received, the frequency offset is enforced to be −200 ppm, then a second enforced scan is initiated, it is determined whether the beacon or probe response of the designated AP is received, if the beacon or the probe response of the designated AP is received, the frequency offset tracking is executed, and if the beacon or the probe response of the designated AP is not received, the frequency offset tracking is returned to the initial value".

According to the present embodiment, in the STA & SoftAP mode, as mentioned in the step 3111, the process of "the beacon or probe response of other surrounding AP is monitored at a second preset period, if the beacon or probe response of other surrounding AP may be received, the frequency offset does not change and the monitoring for a next period monitor is continuously executed, if the beacon or probe response of other surrounding AP is not received, the non-connection scan is executed, if the beacon or probe response of other surrounding AP may be received during the non-connection scan, the frequency offset does not change, and if the beacon or probe response of other surrounding AP is not received, the frequency offset is modified and the enforced scan is initiated; if the beacon or probe response may be received after the frequency offset is modified and the enforced scan is executed, then the frequency offset tracking is executed, and if the beacon or probe response may not be received after the frequency offset is modified and the enforced scan is executed, the frequency offset tracking is returned to the initial value" is simultaneously implemented by following two monitoring solutions: first, the beacon or probe response of other surrounding AP is monitored at a period of 6 seconds, the frequency offset tracking is executed, and this logic is on all the time; second, the monitoring is executed at a period of 72 seconds, that is, 12 times of 6 seconds are executed, if the beacon or probe response of other surrounding AP fails to be monitored within the period of 72 seconds, the non-connection scan is executed, and if it is received, the monitoring at the period of 72 seconds is restarted.

In an embodiment, the first preset period and the second preset period may be the same or different.

Figure 2:
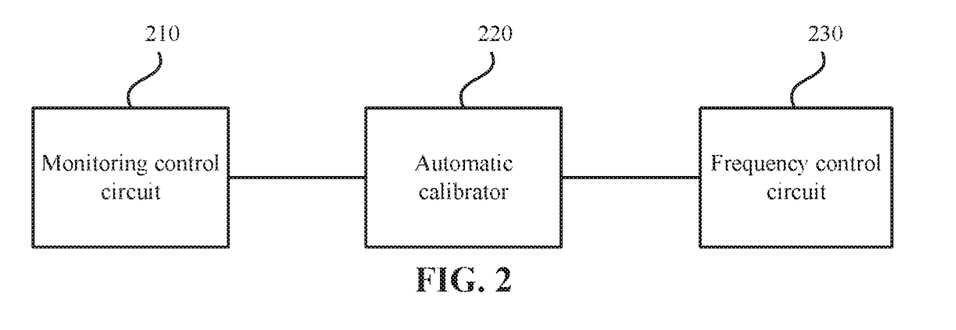
FIG. 2 is a block diagram of a device for automatically calibrating wireless frequency offsets according to the present disclosure.

In an embodiment, the present disclosure further provides a device for automatically calibrating wireless frequency offsets, which is applied to a Wi-Fi wireless transmission module, as shown in FIG. 2, and the device includes a monitoring control circuit 210, an automatic calibrator 220, and a frequency control circuit 230.

The monitoring control circuit 210 is configured to monitor or scan specific data packets of the AP to acquire a frequency offset;

the automatic calibrator 220 is configured to acquire a frequency offset between a central frequency of the Wi-Fi wireless transmission module and a central frequency of the AP according to the specific data packet; (i.e. the central frequency value to be tracked is calculated according to a scanning result or a monitoring result);

the frequency control circuit 230 is configured to execute frequency offset tracking according to the frequency offset to control the Wi-Fi wireless transmission module to calculate a central frequency according to the frequency offset acquired for a surrounding AP of the Wi-Fi wireless transmission module, so that the calculated frequency offset and the central frequency of the surrounding AP are within a preset standard, and the frequency control circuit 230 is configured to adjust the central frequency of the Wi-Fi wireless transmission module according to the calculated central frequency.

In an embodiment, the above device for automatically calibrating wireless frequency offsets further includes an operation mode controller.

The operation mode controller is configured to control the operation mode.

The monitoring control circuit is configured to monitor or scan the specific data packet of the AP in different manner based on different operation modes.

The operation modes include an STA mode, a SoftAP mode and an STA&SoftAP mode.

In an embodiment, the frequency control circuit is constituted of hardware, in an embodiment, the frequency control circuit is a hardware analog circuit, and the central frequency may be controlled through a software configuration register. The monitoring control circuit receives the data packet by hardware and then delivers the data packet to software for processing; the automatic calibrator may implement the tracking logic in combination with the software to calculate a reasonable central frequency value based on the frequency offset, i.e., based on the scanning result or monitoring result, and adjust the central frequency to the reasonable frequency value. The design of the device can realize the purpose of automatic adjustment of the central frequency in the Wi-Fi chip without a temperature sensing module.

What is claimed is:

1. A method for automatically calibrating wireless frequency offsets, comprising:
    monitoring or scanning, by a wireless fidelity (Wi-Fi) wireless transmission module, a specific data packet of an access point (AP) according to an operation mode of the Wi-Fi wireless transmission module; wherein the operation mode of the Wi-Fi wireless transmission module comprises a station (STA) mode, a station and soft AP (STA&SoftAP) mode and a soft AP (SoftAP) mode;
    acquiring, by the Wi-Fi wireless transmission module, a frequency offset between a central frequency of the Wi-Fi wireless transmission module and a central frequency of the AP according to the specific data packet; and
    executing, by the Wi-Fi wireless transmission module, frequency offset tracking according to the frequency offset to control the Wi-Fi wireless transmission module to calculate a central frequency according to the frequency offset acquired for a surrounding AP of the Wi-Fi wireless transmission module in such a way that each of the calculated central frequency and the frequency offset for the surrounding AP is within a preset range, and adjusting the central frequency of the Wi-Fi wireless transmission module according to the calculated central frequency;
    wherein monitoring or scanning the specific packet of the AP comprises: monitoring a specific data packet of the surrounding AP of the Wi-Fi wireless transmission module or scanning a specific data packet of a designated communication AP;
    wherein in response to determining that the Wi-Fi wireless transmission module operates in the STA mode, the method comprises:
    in response to determining that an STA interface of the Wi-Fi wireless transmission module is unconnected to any AP, in response to determining that the STA interface is in an idle mode, keeping the frequency offset unchanged, and in response to determining that the STA interface is not in the idle mode, executing a non-connection scan; in response to determining that the Wi-Fi wireless transmission module receives the specific data packet of the surrounding AP, keeping the frequency offset unchanged, and in response to determining that the Wi-Fi wireless transmission module fails to receive the specific data packet of the surrounding AP, modifying the frequency offset and initiating an enforced scan; in response to determining that the specific data packet is received after the frequency offset is modified and the enforced scan is executed, executing the frequency offset tracking, and in response to determining that the specific data packet is not received after the frequency offset is modified and the enforced scan is executed, returning the frequency offset tracking to an initial value;
    in response to determining that the STA interface attempts to get connected to the designated communication AP, executing a connection scan; in response to determining that the Wi-Fi wireless transmission module receives the specific data packet of the designated communication AP, keeping the frequency offset unchanged, and in response to determining that the Wi-Fi wireless transmission module fails to receive the specific data packet of the designated communication AP, modifying the frequency offset and initiating the enforced scan; in response to determining that the specific data packet of the designated communication AP is received after the frequency offset is modified and the enforced scan is executed, executing the frequency offset tracking, and in response to determining that the specific data packet of the designated communication AP is not received after the frequency offset is modified and the enforced scan is executed, returning the frequency offset tracking to the initial value;
    in response to determining that the STA interface is connected to the designated communication AP, executing the non-connection scan or the connection scan, and executing the frequency offset tracking following the connected designated communication AP.

2. The method according to claim 1, wherein in response to determining that the Wi-Fi wireless transmission module operates in the SoftAP mode, the method comprises:
    monitoring the specific data packet of the surrounding AP at a first preset period; in response to failure in monitoring the specific data packet, executing no operation, and in response to success in monitoring the specific data packet, executing the frequency offset tracking.

3. The method according to claim 1, wherein in response to determining that the Wi-Fi wireless transmission module operates in the STA&SoftAP mode, the method comprises:
    in response to determining that an STA interface of the Wi-Fi wireless transmission module is connected to the designated communication AP, executing a non-connection scan or a connection scan, and executing the frequency offset tracking following the connected designated communication AP;
    in response to determining that the STA interface is unconnected to any AP, a SoftAP interface of the Wi-Fi wireless transmission module is unconnected to any station, and the STA interface does not initiate a connection, monitoring the specific data packet of the surrounding AP at a second preset period; in response to determining that the Wi-Fi wireless transmission module receives the specific data packet of the surrounding AP, keeping the frequency offset unchanged and continuing the monitoring for a next period, and in response to determining that the Wi-Fi wireless transmission module fails to receive the specific data packet of the surrounding AP, executing the non-connection scan; in response to determining that the specific data packet of the surrounding AP is received during the non-connection scan, keeping the frequency offset unchanged, and in response to determining that the specific data packet of the surrounding AP is not received, modifying the frequency offset and initiating an enforced scan; in response to determining that the specific data packet is received after the frequency offset is modified and the enforced scan is executed, executing the frequency offset tracking, and in response to determining that the specific data packet is not received after the frequency offset is modified and the enforced scan is executed, returning the frequency offset tracking to an initial value;

in response to determining that the STA interface is unconnected to any AP, the SoftAP interface is unconnected to any station, and the STA interface attempts to get connected to an AP, executing the connection scan; in response to determining that the Wi-Fi wireless transmission module receives the specific data packet of the designated communication AP, keeping the frequency offset unchanged, and in response to determining that the Wi-Fi wireless transmission module fails to receive the specific data packet of the designated communication AP, modifying the frequency offset and initiating the enforces scan; in response to determining that the specific data packet of the designated communication AP is received after the frequency offset is modified and the enforced scan is executed, executing the frequency offset tracking, and in response to determining that the specific data packet of the designated communication AP is not received after the frequency offset is modified and the enforced scan is executed, returning the frequency offset tracking to the initial value.

4. The method according to claim 3, wherein in response to determining that the Wi-Fi wireless transmission module operates in the STA&SoftAP mode, the method comprises:

in response to determining that the STA interface is unconnected to any AP, the SoftAP interface of the Wi-Fi wireless transmission module is connected to a station, and the STA interface does not initiate a connection, executing no operation to ensure that a device mounted under the SoftAP interface is not dropped off;

in response to determining that the STA interface is unconnected to any AP, the SoftAP interface is connected to a station, and the STA interface attempts to get connected to an AP, executing the connection scan; in response to determining that the Wi-Fi wireless transmission module receives the specific data packet of the designated communication AP, keeping the frequency offset unchanged, and in response to determining that the Wi-Fi wireless transmission module fails to receive the specific data packet of the designated communication AP, modifying the frequency offset and executing the enforced scan; in response to determining that the specific data packet of the designated communication AP is received after the frequency offset is modified and the enforced scan is executed, executing the frequency offset tracking, and in response to determining that the specific data packet is not received after the frequency offset is modified and the enforced scan is executed, returning the frequency offset tracking to the initial value.

5. The method according to claim 3, wherein in response to determining that the STA interface is unconnected to any AP, the SoftAP interface of the Wi-Fi wireless transmission module is unconnected to any station, and the STA interface does not initiate the connection, monitoring the specific data packet of the surrounding AP at the second preset period, and in response to determining that the Wi-Fi wireless transmission module fails to receive the specific data packet of the surrounding AP, executing the non-connection scan comprises:

receiving a manual non-connection scan operation actively initiated by a user.

6. The method according to claim 4, wherein in response to determining that the STA interface is unconnected to any AP, the SoftAP interface of the Wi-Fi wireless transmission module is connected to the station, and the STA interface does not initiate the connection, executing no operation to ensure that the device mounted under the SoftAP interface is not dropped off comprises:

in response to a manual non-connection scan operation actively initiated by a user, executing no operation to ensure that the device mounted under the SoftAP interface is not dropped off.

7. The method according to claim 1, wherein the specific data packet comprises a beacon or a probe response frame.

8. The method according to claim 1, wherein monitoring or scanning, by the Wi-Fi wireless transmission module, the specific data packet of the AP according to the operation mode of the Wi-Fi wireless transmission module comprises:

in the STA mode or the STA&SoftAP mode, in response to determining that an STA interface of the Wi-Fi wireless transmission module is unconnected to any AP or does not initiate a connection to any AP, monitoring, by the Wi-Fi wireless transmission module, the specific data packet of the surrounding AP; and in the STA mode or the STA&SoftAP mode, in response to determining that the STA interface of the Wi-Fi wireless transmission module is connected to the designated communication AP or initiates a connection to the designated communication AP, scanning, by the Wi-Fi wireless transmission module, the specific data packet of the designated communication AP.

9. A device for automatically calibrating wireless frequency offsets, applied to a wireless fidelity (Wi-Fi) wireless transmission module, comprising:

a monitoring control circuit, which is configured to monitor or scan a specific data packet of an access point (AP) according to an operation mode of the Wi-Fi wireless transmission module; wherein the operation mode of the Wi-Fi wireless transmission module comprises a station (STA) mode, a station and soft AP (STA&SoftAP) mode and a soft AP (SoftAP) mode;

an automatic calibrator, which is configured to acquire a frequency offset between a central frequency of the Wi-Fi wireless transmission module and a central frequency of the AP according to the specific data packet; and a frequency control circuit, which is configured to execute frequency offset tracking according to the frequency offset to control the Wi-Fi wireless transmission module to calculate a central frequency according to a frequency offset acquired for a surrounding AP of the Wi-Fi wireless transmission module in such a way that each of the calculated central frequency and the frequency offset for the surrounding AP is within a preset range, and adjust the central frequency of the Wi-Fi wireless transmission module according to the calculated central frequency;

wherein in response to determining that the Wi-Fi wireless transmission module operates in the STA mode, the device is configured to:

in response to determining that an STA interface of the Wi-Fi wireless transmission module is unconnected to any AP, in response to determining that the STA interface is in an idle mode, keep the frequency offset unchanged, and in response to determining that the STA interface is not in the idle mode, execute a non-connection scan; in response to determining that the Wi-Fi wireless transmission module receives the specific data packet of the surrounding AP, keep the frequency offset unchanged, and in response to determining that the Wi-Fi wireless transmission module fails to receive the specific data packet of the surrounding AP, modify the frequency offset and initiate an enforced scan; in response to determining that the specific data packet is received after the frequency offset is modified and the enforced scan is executed, execute the frequency offset tracking, and in response to determining that the specific data packet is not received after the frequency offset is modified and the enforced scan is executed, return the frequency offset tracking to an initial value;

in response to determining that the STA interface attempts to get connected to the designated communication AP, execute a connection scan; in response to determining that the Wi-Fi wireless transmission module receives the specific data packet of the designated communication AP, keep the frequency offset unchanged, and in response to determining that the Wi-Fi wireless transmission module fails to receive the specific data packet of the designated communication AP, modify the frequency offset and initiate the enforced scan;

in response to determining that the specific data packet of the designated communication AP is received after the frequency offset is modified and the enforced scan is executed, execute the frequency offset tracking, and in response to determining that the specific data packet of the designated communication AP is not received after the frequency offset is modified and the enforced scan is executed, return the frequency offset tracking to the initial value;

in response to determining that the STA interface is connected to the designated communication AP, execute the non-connection scan or the connection scan, and execute the frequency offset tracking following the connected designated communication AP.

10. The device according to claim 9, further comprising:

an operation mode controller, which is configured to control an operation mode.

11. The device according to claim 9, wherein in the STA mode or the STA&SoftAP mode, in response to determining that an STA interface of the Wi-Fi wireless transmission module is unconnected to any AP or does not initiate a connection to any AP, the monitoring control circuit is configured to monitor the specific data packet of the surrounding AP; and in the STA mode or the STA&SoftAP mode, in response to determining that the STA interface of the Wi-Fi wireless transmission module is connected to the designated communication AP or initiates a connection to the designated communication AP, the monitoring control circuit is configured to scan the specific data packet of the designated communication AP.

* * * * *